July 26, 1966  D. B. PALL  3,262,563
DUAL ELEMENT, DUAL VALVE FILTER ASSEMBLY
HAVING A FLOW CONTROL VALVE
Filed March 11, 1963  2 Sheets-Sheet 2

United States Patent Office 3,262,563
Patented July 26, 1966

3,262,563
DUAL ELEMENT, DUAL VALVE FILTER ASSEMBLY HAVING A FLOW CONTROL VALVE
David B. Pall, Roslyn Estates, N.Y., assignor to Pall Corporation, Glen Cove, N.Y., a corporation of New York
Filed Mar. 11, 1963, Ser. No. 264,160
15 Claims. (Cl. 210—90)

This invention relates to filter assemblies, and more particularly to filter assemblies especially designed for use with hydraulic systems of aircraft, to remove a substantial proportion of very fine incident particles.

So many extraordinary demands are made upon the hydraulic systems of aircraft, that the surprising thing is not that there is an occasional failure, but that the systems are as effective as they are. The hydraulic fluids used must withstand temperature ranging from −65° F. to as high as 275° F., and occasionally even higher, and must be completely flowable and operative in the system under these conditions.

Wear and abrasion of parts result in the production of very fine particles, usually 0.05 to 1 micron in diameter. While these fine particles are so small that individually they cause no obstruction, there is nonetheless a tendency for sedimentation of such particles in regions where the rate of flow is rather low, and for collection of such particles in the small (often 5 microns or less) clearances in pump pistons, servo valves, actuators, valves and other components. In the course of time, serious obstructions can be built up even from such small particles. Indeed, it is the very fine particles that are usually responsible for pump failure in such systems, nowadays, since these are the particles not removed by conventional filters.

Maintenance of a clean hydraulic fluid of course requires efficient filtration. In this respect, the fine particles present a special problem, because it is quite difficult to prepare a filter element capable of removing very small particles that has a sufficient flow capacity to meet the flow requirements of the system. In normal flight, a flow of hydraulic fluid of the order of 5 gallons per minute or less may be sufficient, but whenever the landing gear flaps or other large hydraulically operated gear is operated, a higher flow rate can be required, considerably in excess of 5 gallons per minute under certain conditions. Flow capacity of a filter is of course a function of surface area, and in the limited space requirements of aircraft, it has not until very recently been possible to provide a filter element sufficiently rugged for hydraulic system service and having a fine enough incident particle removal rating, and a high enough flow capacity, to meet these requirements. The result has been that in aircraft, at least, it has not been possible to design a filter element that is capable of removing a substantial proportion of very fine incident particles.

In accordance with the invention, a rugged filter assembly is provided that is capable of removing a substantial proportion of very fine particles, as small as 0.05 micron, as well as nearly all incident particles over 0.45 micron in diameter, and all incident particles over 3 microns in diameter, and that is capable of supplying a flow rate as high as may be desired upon demand. A filtered flow is provided at all flow rates, but at flow rates in excess of a predetermined maximum, only a portion of the flow is filtered through the primary filter element, of low micron removal rating, capable of removing all particles as small as 3 microns in diameter. The remainder is diverted by a flow control valve, in accordance with the invention, through a secondary filter of normal flow capacity and high micron removal rating, capable of removing most of the incident particles as small as particles 1.5 microns or larger in diameter, and all incident particles over 15 microns. The normal flow through the primary element is the maximum required, plus a safe margin, for normal operational flow in the system in which the element is installed. Only when extraordinary requirements are made upon the flow, beyond this maximum, does the flow control valve divert the incremental portion of the flow through the secondary (coarse or high micron removal rating) filter element. Since such extraordinary flow requirements are usually made only for short periods, less than 2 to 3% of the total flight time, the filter assembly of the invention effectively keeps the hydraulic fluid substantially free of particles larger than 0.45 micron in diameter, since any such particles that may enter the fluid during the times of extraordinary flow are removed later in the course of normal flow.

As a further feature, the filter assembly of the invention provides for maintenance of a filtered flow through the secondary or coarse filter element whenever the primary element is clogged or so obstructed that the flow-through results in a pressure differential across that element above a predetermined minimum. In this event, the flow control valve provided diverts through the secondary filter element flow above that which the partially or fully clogged primary element can pass.

A second by-pass as an optional feature is provided for the secondary filter element, so that when this element becomes clogged, or so obstructed as to increase the pressure differential across it to above a predetermined minimum, then all flow through the filter by-passes both the primary and the secondary filter elements. Normally, there is ample time after the primary element has become obstructed for the filter element to be serviced before the secondary filter element becomes clogged. Thus, the second by-pass line would come into use only in the event of an emergency of rather unusual character.

In certain systems, intolerant of any contaminant above 15 microns, it will be preferable to omit the by-pass valve around the secondary element, in which event the secondary element is preferably fabricated with internal support such that it will withstand full system pressure as a differential pressure across it.

Pressure indicators can be provided, indicating the reaching of a predetermined pressure differential across the primary filter element, and across the secondary filter element, so that an indication is given to the operator that the primary or secondary filter element or both have become clogged, and require servicing.

For control of the diversion of fluid from the primary filter element at flow rates above the predetermined maximum, as well as diversion whenever the primary filter element becomes obstructed so that the pressure differential across it reaches a predetermined minimum, there is provided a flow valve of the orifice or venturi type, so designed as to be actuated by an increase in the velocity of flow through the valve. Since this increase in velocity is proportional to the amount of fluid and therefore the pressure of fluid applied on the inlet side of the valve, the valve is responsive to changes in flow volume and consequently to changes in flow demand made upon the filter assembly of the invention. This valve is placed in the line of flow between the inlet to the filter assembly, and the primary filter element. Preferably, the valve is placed in an inlet passage.

The valve has a poppet biased against a valve seat, and the poppet has an orifice or throat such as a venturi considerably reducing the diameter of the passage available for flow, such as in the inlet passage, and as a consequence of this reduction in diameter, the velocity of flow through the valve poppet orifice increases. A small hole or passage communicates the low static pressure at the venturi throat to a closed pressure chamber within which the poppet reciprocates. Hence, the poppet remains stationary, in position against the valve seat, whenever the force against it due to fluid flow or pressure at the inlet side is less than the force in the opposite direction, which is the total of the force exerted by the fluid pressure in the closed pressure chamber and the biasing force.

The total pressure in the fluid remains constant, and is the sum of the static pressure and the velocity pressure. Hence, an increase in the velocity pressure at any point will result in a decrease in the static pressure at that point. Under normal flow conditions, a steady state exists in which the force due to the high static pressure on the inlet side of the valve poppet is less than the total force holding the poppet in place, and the poppet remains stationary. However, when the flow volume and hence rate increases, the velocity of flow through the orifice increases, and results in a reduction in static pressure at the orifice, which is communicated to the chamber and reduces the force tending to hold the poppet stationary against the inlet flow. The valve poppet is designed to be actuated whenever the reduction in static pressure across the orifice (in the pressure chamber) falls below a predetermined minimum.

The valve is so positioned in the fluid line, such as the inlet passage, as under normal flow conditions to close off a line leading to the secondary or high micron removal rating filter element. The result is that all flow must pass through the orifice or venturi of the valve poppet into the primary filter element. At a predetermined pressure differential in static pressure between the valve face or inlet side of the valve, and the pressure chamber on the other side of the valve, the minimum value of which is determined by the flow requirements of the system, the valve is actuated in a manner to open the passage between the inlet and the secondary filter element.

The amount of opening can be designed to be proportional to the magnitude of the pressure differential, and thus the amount of diversion of flow to the secondary element can be made directly dependent upon the rate of flow. While the valve is open, flow to the primary filter element continues at the normal but maximum rate through the orifice or venturi of the valve poppet. Thus, at all positions of the valve poppet there is flow supplied to and through the primary filter element, while it remains unobstructed. Hence, at flow rates above the predetermined maximum, there is flow through both the primary and the secondary filter elements. The filter is thus able to accommodate itself to the increased demand for flow, and all of the flow through the filter assembly is still filtered.

A preferred embodiment of the flow valve of the invention comprises structurally a poppet, reciprocatingly mounted in a closed pressure chamber and spring-biased against a valve seat in a position to close off a line to the secondary filter element, and a constricted flow passage through the poppet in the form of an orifice or venturi connecting the inlet with the passage leading to the primary filter element in all positions of the valve, and connected at the orifice or venturi to the pressure chamber. The pressure exerted by the compression spring against the poppet can be adjusted as required, and the dimensioning of the orifice or venturi is matched with the compressive force of the spring, and the dimensioning of the pressure chamber and surface area of the poppet exposed therein to fluid pressure, so as to obtain actuation of the valve poppet at the predetermined pressure differential in static pressure across the orifice.

While spring biasing means is preferred, magnetic, electrostatic or electromagnetic biasing means can also be used. In the case of magnetic or electrostatic means, twin magnets can be used, at each extremity of reciprocation of the poppet, and the poppet itself can be magnetic, oriented so as to be attracted to the magnet holding the poppet in the closed position and repelled by the magnet holding the poppet in the open position, and both magnets are so placed that the poppet at each extremity is within the field of both magnets. Thus, reseating of the poppet in the closed position is ensured when the flow is returned to normal. In the case of electromagnetic biasing means, the coil windings can be varied to provide the required biasing forces.

The valve poppet can also be and in a preferred embodiment is designed to be actuated by a fluid pressure against the inlet face of the orifice, whenever the pressure drop across the primary element reaches a predetermined maximum. This is done by shaping the inlet face of the valve poppet to a larger surface area than the combined surface area in the pressure chamber and facing the passage on the outlet side of the poppet. Thus, whenever the fluid pressure on the inlet face exceeds the pressure in the passage closed off by the poppet by a predetermined amount, the valve poppet is actuated, just as in the case of a predetermined excessive static pressure differential.

Thus, the valve can be designed to actuate, in the preferred embodiment, whenever the fluid's passage through the primary filter element becomes obstructed, so that the total pressure differential between the inlet passage and the passage to the secondary filter element across the poppet exceeds a predetermined maximum. Thereupon, the valve poppet is actuated, exposing the line to the secondary filter element, by-passing the primary element, and filtered flow continues by way of the secondary filter element, on an emergency basis until the primary element can be serviced.

Thus, the same valve can serve to control flow through a secondary filter element in case of temporary need, when an excessive flow is needed beyond normal requirement, or in case of plugging or obstruction to a flow-reducing degree of the primary filter element.

Those skilled in the art are aware of the parameters to be taken into account in determining the diameters of orifices or venturi passes. The exact dimensions for the valve poppet faces and passages must be determined for each particular system, but this is readily accomplished by standard design and calculation.

The flow valve can be constructed of any durable material inert to the fluid being circulated through the system. Metal valves, such as those made of aluminum, stainless steel, and other stainless alloys, are preferred, but it is also possible to fabricate the valve from synthetic polymers and cellulose derivatives, such as polytetrafluoroethylene, polypropylene, polyethylene, polystyrene, nylon, polyoxymethylene, acrylonitrile rubbers and fluorocarbon rubbers.

The primary filter element of the invention is selected to meet the system requirements for incident particle removal. As has been stated, hydraulic systems of aircraft may require the removal of all incident particles as small as 3 microns in diameter. However, the primary filter element of the invention can remove a proportion of even smaller particles, down to 0.05 micron in diameter, or all of such particles, if required, or only considerably larger particles, if removal of such a high proportion of small particles is unnecessary. There is no upper limit, but filters having the ability to remove all particles of from 3 to 10 microns are generally useful.

As the primary filter element, any filter material can be employed. Sheet filter material can be used, such as porous sheets made of sintered particulate material, and wire mesh and sinter-bonded wire mesh, disclosed in U.S. Patents Nos. 2,925,650 and 3,049,796 in which the wires or particles are made of metals or natural or synthetic plastic materials, such as stainless steel, aluminum, ceramic materials, polyvinyl chloride, polyethylene, polypropylene, polystyrene, and polytetrafluoroethylene.

For removal of all incident particles as small as 3 microns in diameter, the primary filter element should have a microporous structure in which no pore is larger than about 10 microns, and the microporous structure should have a high voids volume, preferably of at least 75%. A preferred microporous sheet material for use in the manufacture of the primary filter element is a bat or sheet having deposited therein or thereon and bonded thereto a layer having the desired ultrafine or microporous dimensions and voids volume. Preferred embodiments of microporous materials are described in U.S. application Serial No. 215,151 filed August 6, 1962, and have a maximum pore diameter of less than about 10 microns and an average pore diameter of about 0.005 to 3 microns. Also useful are the microporous materials prepared in accordance with U.S. application Serial No. 98,595 filed March 27, 1961 and U.S. application Serial No. 74,130 filed December 6, 1960 and now U.S. Patent No. 3,158,532.

Because filter materials having such small particle removal ratings have a relatively low flow capacity, it is preferred to form the primary filter element in pleats, convolutions or corrugations, so as to provide a greater surface area in a small volume.

The secondary filter element is selected primarily for flow capacity, so as to pass the required volume of fluid per unit time under the maximum flow demands of the system, and is preferably also selected so as to give the lowest incident particle removal ratings obtainable at such flow capacity.

The particle removal rating of the secondary filter element is in no way critical, and can range from 5 to 50 microns or higher, depending on the system parameters. Particles passed in flow through the secondary filter element are only temporarily in the system in any event, since the primary filter element cleans up such particles during normal flow, even when the flow through the secondary filter element is due to plugging of the primary filter element.

If the primary element is made of material (for example, sintered powder, felt or paper) which may release particles or fibers from its downstream surface, the secondary filter should preferably be fine enough to remove all such particles or fibers.

Secondary filter elements are available, capable of removing 90% of particles larger than 1.5 microns in diameter, which have the required flow capacity. Such elements are made of wire mesh and of sintered-bonded wire mesh such as is described in U.S. Patents Nos. 2,925,650 and 3,049,796. Also useful are filter elements made of sinter-bonded metal particles, such as sheets of porous stainless steel and other stainless alloys, bronze, aluminum and steel. Any of the materials described above for use in the primary filter element can also be employed for the secondary filter element, but with a larger pore diameter so as to have a higher micron removal rating, for the required greater flow capacity.

The secondary filter element also preferably is formed in pleats, convolutions or corrugations, for greater surface area.

Figure 1:
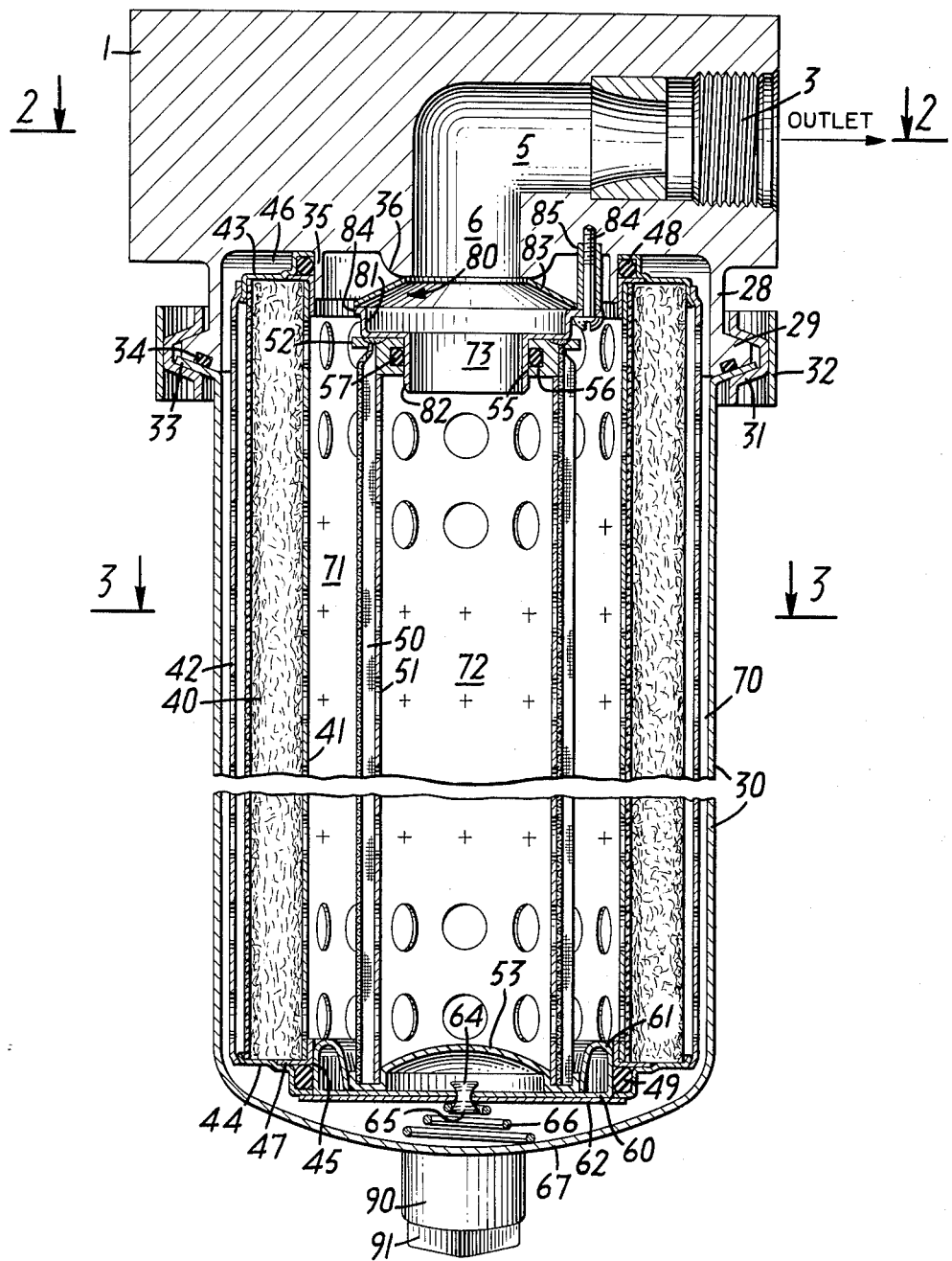
FIGURE 1 is a longitudinal section through a filter assembly or unit in accordance with the invention, showing the filter head and filter bowl, and the elements disposed therein.
Figure 2:
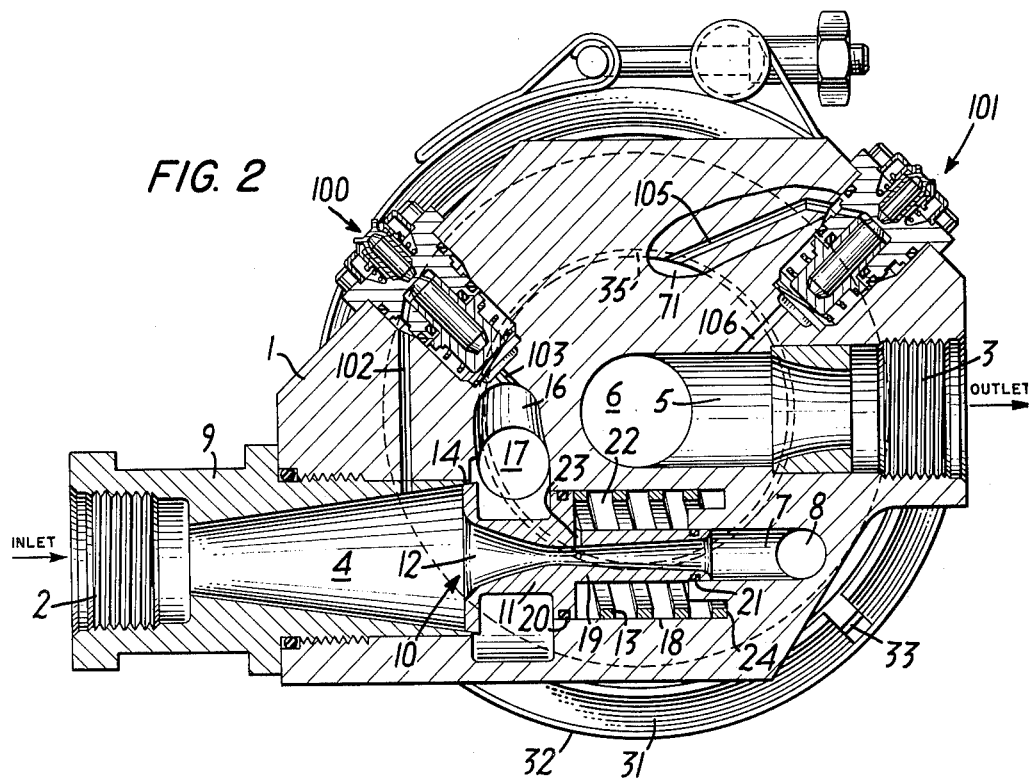
FIGURE 2 is a cross-sectional view of the filter unit of FIGURE 1, taken along the lines 2—2 and looking in the direction of the arrows.

The filter unit shown in the drawings comprises a head 1 provided with a threaded inlet port 2 and a threaded outlet port 3, fitted with suitable pipe connections. Port 2 leads to an internal passages 4, and threadably inserted in inlet port 2 and passage 4 is an inlet fitting 9. Port 3 serves as the exit for internal passage 5, which extends laterally and then downwardly to a port 6 in the central portion of the lower face of the head 1.

Disposed at the inner end of the passage 4 in a socket 18 of the head is a venturi valve 10 comprising a poppet 11 having a central venturi passage 12, opening on the inlet face of the poppet into passage 4 of the head, and on the outlet face of the poppet opening into passage 7 in the head. Passage 7 extends first laterally and then downwardly, leading to a port 8 on the lower face of the head. The inlet face of the poppet 11 exposes a greater surface area to fluid pressure than does the combined surface area of the poppet on the other side thereof facing passage 16 and chamber 22 for reasons to be detailed later.

The poppet 11 of the venturi valve is biased by spring 13 against a valve seat 14 on the inner face of the fitting 9. The fitting 9 has a central passage increasing in diameter from the outer end beyond port 2 to the inner end in the passage 4, adjacent the valve seat 14. This tapering has two purposes. It permits a design of the inlet face of the poppet 11 to expose a larger surface area to fluid pressure than on the outlet side. It also facilitates flow when the poppet is moved away from the seat 14 to expose another passage 16 of the head, which extends downwardly and also opens on the lower face of the head at port 17. It will be seen from FIGURE 1, that the passage 16 is open to flow of fluid from the inlet 2 through passage 4 whenever the poppet 11 is retracted from the seat 14 against the opening 13.

A leak-proof seal between the poppet 11 and the wall of the head socket 18 and passage 7 in which the poppet reciprocates is provided by O-ring seals 20 and 21. The side wall of the poppet 11 and the wall of the socket 18 define a pressure chamber 22 entirely sealed off from the remainder of the socket by the O-ring seals 20 and 21, and reciprocating with the poppet in the socket. The chamber 22 is connected by passage 23 to the periphery at the center of the venturi passage 12 of the poppet 11, so that the static pressure in the chamber 22 is always equal to the static pressure at the venturi, for reasons to be detailed later. The spring 13 is seated in a recess 24 in the head at one end of chamber 22.

The head 1 has a downwardly extending tubular portion 28, provided with an outwardly extending lip 29, and to this lip is attached a filter bowl 30 by means of the V-ring clamp 31 and enclosing ring 32, thus providing easy removal of the filter bowl from the head. A leak-proof seal is provided between the outwardly flared upper portion 33 of the filter bowl and the lower face of the lip 29 by means of the O-ring seal 34.

Figure 3:
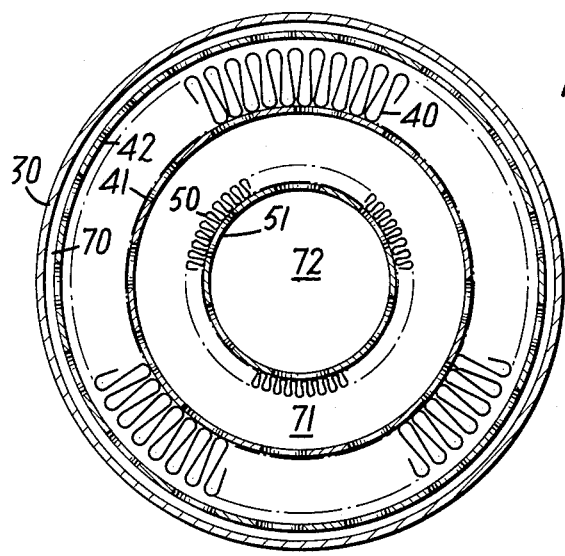
FIGURE 3 is a cross-section of the bowl portion of the filter unit of FIGURE 1, taken along the line 3—3 and looking in the direction of the arrows.

Disposed in the bowl are a primary small particle removal rating filter element 40, and a secondary large particle removal rating filter element 50. The filter element 40 is formed of any filter material capable of removing 98% of all particles having a diameter as low as 0.45 micron. The element shown in the drawing is made of a preferred filter material, cellulose paper, epoxy resin impregnated, and coated with a blend of glass fibers, diatomaceous earth and potassium titanate, prepared as described in U.S. application Serial No. 98,595, filed March 27, 1961, and Serial No. 215,151, filed August 6, 1962. Also useful are the filter elements described and claimed in U.S. application Serial No. 74,130, filed December 6, 1960, and now U.S. Patent No. 3,158,532. The material is in corrugated form, as is best seen in FIGURE 3. The corrugations are supported both within and without by cylindrical perforated cores of sheet metal, such as aluminum or stainless steel, the inner core being designated 41 and the outer core 42. Thus, both surfaces of the primary element 40 are supported and protected by a metal covering.

The assembly of the corrugated filter and two cores is held between upper and lower end caps 43 and 44, respectively. Each of the end caps 43 and 44 is provided with a central aperture 45. At the inner periphery of each end cap, abutting the central aperture, are pieces 46 and 47 respectively, which are bonded to the end caps, and turned outwardly and then laterally, to form with the caps the grooves within which are captured O-rings 48 and 49.

The opening in the lower end cap 44 is closed off by the bottom cap 60. The cap 60 has an upwardly extending reentrant portion 61, fitting tightly within the opening of the end cap 44, and engaging the inner periphery of the end cap and of the inner piece 47. A leak-proof seal with the cap 60 is formed by the O-ring 49.

The cap 60 is secured in the opening 45 by the end plate 62, the periphery of which extends beyond the opening 45 in the end cap, and cap 60 and plate 62 are locked together by the grooved ring 64. The lower flange 65 of the ring 64 retains a spring 66, the other end of which is biased against the bottom 67 of the bowl 40.

The head 1 is provided with a second inner downward tubular extension 35, over which the opening 46 in the top end cap 43 fits, and the O-ring seal 48 provides a leak-proof seal between the end cap and the head portion 35. The spring 66 at the bottom of the bowl holds the cap 43 and consequently the primary filter element 40 tightly against the head 1. As a result, the outer core 42 surrounding primary filter element 40 and the filter bowl 30 define between them a space 70 just inside the wall of the bowl. The port 8 of the head 1 opens into this space, but the only exit is through filter element 40. It is thus evident that fluid entering through the inlet 2, passages 4 and 7, and port 8 of the head, into the space 70 can only emerge from the bowl 30 by passing through core 42, the primary filter element 40, and core 41, in sequence.

The secondary filter element 50 is concentrically disposed within the inner core 41, at a point spaced therefrom, thereby defining a space 71 between the outer surface of the secondary filter element and the core 41. The port 17 of the head opens into the bowl 30 directly over the space 71. The secondary filter element is made of a sintered wire mesh, prepared in accordance with U.S. Patents Nos. 2,925,650 and 3,049,796, and having a surface of sinter-bonded fine metal powder, in accordance with U.S. Patent No. 3,061,917. In this case, both the sintered wire mesh and the metal powder are made of stainless steel. This element, which is also in corrugated form, is supported on a perforated metal cylinder core 51 of aluminum or stainless steel, and the resulting composite welded to top and bottom end caps 52 and 53, respectively, in accordance with the process and structure of U.S. Patents Nos. 3,007,579 and 3,007,238. The bottom end cap 53 is closed. The top end cap 52 has a central opening 55, and is turned inwardly at the opening to form a groove 56 within which is placed an O-ring 57. The bottom plug 60 inserted in the central opening of end cap 44 positions the secondary element 50 correctly with respect to the head 1 and passage 6.

A relief valve assembly 80 is provided, between passage 71 and and passage 73, composed of an insert 81 having an inner flanged opening 82 fitting into the corresponding opening of the end cap 52, and annular spring disc 83, available commercially as a Belleville washer or Belleville spring disc, supported on a flange 84 on the upper end of the insert 81, and seating on the dependent portion 36 of the head 1 at a point adjacent the port thereof. The O-ring seal 57 ensures a leak-proof seal between the inner end of the insert and the end cap, and the three screws 84 and spacer ring 85 hold the relief valve to the head.

The spring disc 83 normally is in the position shown, bowed towards the dependent portion 36 of the head, facing the space 71 between the primary and secondary filter elements. The spring disc 83 forms a seal both with the head portion 36 and the flange 84 of the insert 81. Thus, with the spring disc 83 in the position shown, the space 72 within the secondary filter element 50, the space 73 within the insert 80, port 6 and exit passage 5 are completely closed off from the passage 71, and entry of fluid thereto is obtained only by passage through the secondary filter element 51. Accordingly, while the relief valve 80 is closed, fluid from the primary filter element 40 in order to reach port 6, exit passage 5 and outlet port 3 of the head 1, flows across space 71 and through the secondary filter element 50 into the space 72. Whenever the spring disc 83 moves away from its seat against the head 36, however, and this occurs at predetermined pressure differentials across the secondary filter element 50, between spaces 71, and spaces 72 and 73, a path is opened directly to port 6 and passage 5, so that flow can now continue by-passing the secondary filter element 50, to the outlet port 3 of the head 1. Such flow is an unfiltered flow, in event of an emergency only.

At the bottom wall 67 of the filter bowl 30, there is provided a drain valve 90, opened by turning the hexagonal nut 91. In this manner, when removal of the bowl is required for servicing of the filter elements 40 and 50 or other parts of the filter unit, the bowl can be drained of fluid before removing the V-ring clamp 31 and ring seal 32.

Also provided in the head 1 are two pressure indicators 100 and 101. These indicators preferably are of the magnetic type, as described and claimed in U.S. Patent No. 2,942,572, issued June 28, 1960. Indicator 100 is connected by line 103 to passage 16 of the head, on the other side of the flow valve 10, and by passage 102 with inlet passage 4 of the head, and thus detects any pressure differential in excess of a predetermined maximum between passages 4 and 16. Inasmuch as during normal operations, passage 4 is directly connected through venturi passage 12 and passage 7 of the head with space 70 on the unfiltered fluid side of the primary filter element 40, and passage 16 is connected directly to space 71 on the other side of the primary filter element 40, pressure indicator 100 detects the pressure differential across the primary filter element 40. Thus, it will give a signal whenever the predetermined pressure differential across this element has been exceeded, indicating that the filter element has been plugged or sufficiently obstructed so as to reduce flow therethrough to below the predetermined minimum.

Pressure indicator 101 is connected by passage 105 to the space 71 in the bowl, and by passage 106 to the outlet passage 5 of the head. It will thus give a signal whenever a predetermined minimum pressure differential between these two passages has been exceeded. Passage 5 is on the same side of primary filter element 40 as space 71, and a low pressure in 5 will exist whenever the pressure in 71 is low, until the secondary filter element becomes plugged. When this occurs, the pressure differential across it can reach the level at which indicator 101 is activated, and then the pressure differential at which relief valve 80 is opened, so that the indicator 101 gives an indication of plugging only of the secondary filter element 50, and the beginning of completely unfiltered flow.

The various paths of flow of fluid through the filter unit under the varying flow rates in the system can now be understood. Normally, at all flow rates below a predetermined maximum, say 5 gallons per minute, fluid to be filtered enters the filter unit at port 2, proceeding through the passages of the inlet fitting 9 to passage 4 of the head, and then through orifice 12 of the flow valve to passage 7 of the head, emerging from the head at port 8 into the space 70 between the exterior of the primary filter element and the inner wall of the bowl 30. It then passes through the exterior core 42 of the primary filter element, the primary filter element 40 and the internal core 41 emerging into the space 71 between the primary and secondary filter elements. Next, it passes through the secondary filter element 50 and the core 51 into the space 72 enclosed by the secondary filter element and then through the passage 73 of the insert 80, finally emerging from the bowl 30 at port 6 into the exit passage 5 of the head, leaving the filter unit at outlet port 3.

Inasmuch as the primary filter element 40 is the small particle removal element, and the secondary filter element 50 the large particle removal element, in this normal line of flow the secondary filter element provides no effective contaminant filtering action. It does, however, prevent migration of any material that may become detached from the primary filter element 40, such as loose fibers or particles of bonding resin.

Thus, in normal flow the filter unit is operating at the maximum particle removal rating, and very few particles which have a diameter in excess of 0.45 micron will pass the filter unit. This efficient operation is obtained at all normal flow rates below the predetermined maximum at which valve 10 is actuated.

Whenever a higher flow capacity is required in the system, the pumps operating the fluid will of course be speeded up, and the rate of flow of fluid to the filter unit at inlet 2 will increase. As the rate of flow into the filter unit increases, the velocity of the flow through the venturi 12 of the valve 10 also increases, with the result that the static pressure in the chamber 22 tapping the venturi 12 is decreased. Eventually, the static pressure differential across the valve venturi 12 at which the valve is set to open is reached, and the valve poppet 11 moves away from the seat 12 at the end of the insert 9, thus exposing passage 16 to fluid flow. While this is occurring flow continues through the venturi passage 12 at the normal volume of, say 5 gallons per minute. Since the volume of flow that can pass through the venturi is strictly limited by the dimensions thereof, accordingly the excess fluid flow now passes through passage 16, and emerges from the head at port 17. Port 17 in the head directly faces the space 71 between the primary and secondary filter elements, and thus the excess flow by-passes the primary filter element 40, and, passing through only the secondary filter element 50, emerges into the passage 72 enclosed by the filter element and thence through passage 73, leaving the filter bowl 30 at port 6 and exit passage 5. In the course of such flow it is thoroughly mixed with the filtered flow which continues to pass through the primary filter element 40. The fluid now delivered by the filter unit to the system is therefore composed of fluid passing through the primary filter element and thus effectively stripped of most particles more than 0.45 micron in diameter, together with flow passing only through the secondary filter element, and stripped only of particles in excess of 1.5 microns in diameter. The system can tolerate such a mixed flow for a considerable period of time, but as a matter of fact this flow is continued only for so long as the excess flow demand is made upon the system. As soon as the flow demand diminishes, and the volume of fluid and rate of flow is restored to normal, the pressure upon the flow valve 10 is correspondingly decreased. The velocity of flow through the orifice also decreases proportionately, and the static pressure in chamber 22 once again increases, and returns to normal. When the static pressure differential across the valve between passage 4 and chamber 22 has been reduced to below that at which the valve is opened, the valve returns to its seat 14 at the end of insert 9 under the pressure of the spring 13. Passage 16 to the head is accordingly closed off, and all flow by-passing the primary filter element ceases. All the filtered flow accordingly is subjected to the action of the primary filter element 40, and substantially all particles in the system larger than 0.45 micron in diameter are now removed. Since all of the fluid circulating in the system is eventually recirculated through the primary filter element, any particles which may have escaped the secondary filter element because they are smaller than can be removed thereby, that is, any having a particle size within the range from 1.5 microns down to 0.45 micron, will now be removed from the fluid by the action of the primary filter element. Thus, the presence of such particles in the fluid is only temporary, during the period of excess flow requirements.

In the course of use, as the amount of material removed by the primary filter element increases, flow through the primary filter element becomes obstructed. As this happens, the fluid pressure upon the poppet 11 at the inlet face increases, due to the reduction in flow volume through and on the other side of the primary filter element. This results in a corresponding increase in the pressure differential across the valve between passage 4 and passage 16, which communicates through port 17 with the space 71 between the primary and secondary filter elements. Inasmuch as the valve has a greater surface area at its inlet side, facing passage 4, than at its outlet side, where it faces passage 7, and chamber 22, eventually the fluid pressure or force applied to the valve poppet at the inlet face exceeds the predetermined pressure at which the valve poppet 11 will open, and the valve poppet 11 is then pushed away from the seat 14, against the action of the spring 13, thus exposing passage 16 to the flow of fluid. If desired, the spring 13 can be set so that the amount of opening of the valve can be proportional to the fluid pressure upon the poppet. Thus, flow can continue through the primary filter element for as long a period as possible, until it is plugged completely. At this point, or shortly before, the valve 10 is then fully opened, and all flow passes through the secondary filter element. Up until that point, only a portion of the flow passes through, but a sufficient proportion to maintain the required flow volume to be delivered at the outlet port 3.

With the plugging of the primary filter element 40, and the corresponding reduction in pressure observed in passage 16, due to the pressure sensing connections 102 and 103 on each side of the differential pressure indicator 100, this change in pressure between passages 4 and 16 is detected by the indicator, which, at a pressure differential at or just short of the time of opening of the valve 10 to expose passage 16, signals that the primary filter element is clogged. Thus, the operator is made aware of the condition requiring his attention at or before the time when the secondary filter element is put into service, by-passing the primary filter element. The differential pressure indicator 100 is preferably so set that the signal is given continuously until the filter unit is serviced, since it is important that the flow by-passing the primary filter element not be maintained for any longer length of time than is absolutely necessary.

Flow through the secondary filter element 50 into space 72 will continue until the secondary filter element becomes clogged. In the unlikely event that this should occur, the by-pass valve 80 provides a by-pass around the secondary filter element 50. As the secondary filter element 50 becomes obstructed, due to the removal of contaminants, the pressure differential between spaces 71 and 72 will increase, and eventually it reaches the point at which the spring disc 8 is forced away from its seat against the dependent portion 36 at the head, opening the passage between these two spaces. Just before the pressure reaches that point, the change in pressure between that space 71, now in direct connection with passage 4 of the head, and space 72, which is in direct connection with passage 5 of the head, is detected by the pressure indicator 101, which is in direct communication therewith through passage 105 and passage 106. Accordingly, a signal is given at a pressure differential just before the pressure differential required to open the spring disc 83. The operator now sees the signals of the two pressure indicators 100 and 101, and knows that both filter elements of the filter unit are out of service, so that servicing of the unit is imperative if satisfactory operation of the hydraulic system is to be continued.

Any type of relief valve can be used in place of the spring disc 83, such as a poppet and spring type valve.

The spring disc of the invention is in the form of a disc bowed against the direction of flow, and opens fully at a predetermined pressure differential. The flow-through required is provided by so dimensioning the disc and valve seat as to give an annular opening of the predetermined flow capacity when the disc cracks open. Disc thickness, amount of bow, disc diameter and annular opening diameter are determined by the pressure differential to be resisted, i.e., the resistance to be offered by the spring action of the disc, and the flow capacity needed at a given pressure differential.

The spring disc of the invention is made of material of high yield strength and high hardness. Materials having minimum yield strengths of 30,000 to 250,000 p.s.i.g. can be used. Steel, stainless steel, and nickel chromium alloys are satisfactory, as also are certain synthetic resins such as polytetrafluoroethylene and polyoxymethylene. Metal discs surfaced with synthetic resins also can be used.

The disc can be uniform in thickness throughout or can vary in thickness, thinner at the center than at the edge, to give improved flexing and sealing.

Fluid flow conditions of all kinds can be met by appropriate design of the spring disc to any load-deflection characteristics required in the system. The geometry of these discs is established by the discs' outside diameter and inside diameter, its free height measured from the inside edge (along the perpendicular to the outside edge) and its thickness. Proper selection of the geometry, using mathematical tables and equations of Fortini, Machine Design, September 4, 1958, "Conical-Disc Springs" will give a disc capable of pressure-relieving response to any type of load in any desired way.

While the configuration described herein is considered preferable because it combines flow-control and relief flow past the primary filter element in a single control unit, it will be obvious to those skilled in this art that the same functions can be achieved using different mechanisms. For example, conventional types of flow control valve, direct or pilot operated, could be used in conjunction with a relief valve of the spring biased poppet type, or with a Belleville spring type of relief valve described elsewhere.

The following is claimed:

1. A full flow filter assembly comprising, in combination, a housing having inlet and outlet passages; a primary filter element disposed in the housing; a primary passage leading from the inlet only to the primary filter element; a secondary filter element disposed in the housing; a secondary passage communicating with the inlet and leading to the secondary filter element; and a flow-responsive valve assembly including a valve and a flow control passage disposed in the housing in the primary passage and arranged to direct all normal flow continuously to and through the flow control passage and to and through the primary passage to and through the primary filter element, and closing off flow to the secondary filter element through the secondary passage, but responsive to a predetermined excess volume of flow through the flow control passage to open and allow such excess flow to enter the secondary passage and pass directly through the secondary filter element, while continuing normal flow to and through the primary filter element via the flow control passage, so that both normal and excess flow through the filter assembly is filtered, and normally no unfiltered flow passes directly to the secondary filter element.

2. A filter assembly in accordance with claim 1 in which the primary filter element has a 0.43 to 3 micron particle removal rating and the secondary filter element has a particle removal rating of at most 15 microns.

3. A full flow filter assembly in accordance with claim 1 including a relief valve set to open at a predetermined pressure differential across the secondary filter element by-passing both the primary filter element and the secondary filter element whenever the secondary filter element becomes obstructed and the pressure differential thereacross is exceeded.

4. A filter assembly in accordance with claim 3 in which the relief valve is in the form of a spring disk valve.

5. A filter assembly in accordance with claim 1 wherein the primary filter element is made of paper surfaced with fibrous material and the secondary filter element is made of sintered wire mesh having a surface of metal particles sinter-bonded thereto.

6. A filter assembly in accordance with claim 1 including a differential pressure indicator for detecting and indicating a pressure differential across the primary filter element greater than a predetermined maximum.

7. A filter assembly in accordance with claim 1 including a differential pressure indicator for detecting and indicating a pressure differential across the secondary filter element greater than a predetermined maximum.

8. A filter assembly in accordance with claim 1 wherein the flow responsive valve assembly is also responsive to the total pressure differential thereacross, to open whenever the total pressure differential across the primary filter element exceeds a predetermined maximum.

9. A filter assembly in accordance with claim 8 wherein the flow responsive valve assembly is responsive to a pressure differential between its inlet side and the passage leading to the secondary filter element.

10. A full flow filter assembly comprising, in combination, a housing having inlet and outlet passages, a primary filter element disposed in the housing, a primary passage leading from the inlet only to the primary filter element, a secondary filter element disposed in the housing, a secondary passage communicating with the inlet and leading to the secondary filter element, and a flow responsive valve disposed in the primary passage comprising a poppet having an orifice therethrough for constant flow to and through the primary filter element, said poppet being normally spring-biased in position to close off flow of fluid to the secondary filter element, but responsive to a predetermined excess volume of flow through the orifice to open and allow such excess flow to enter the secondary passage and pass directly to the secondary filter element, while continuing normal flow to and through the primary filter element via the orifice, so that both normal and excess flow through the filter assembly is filtered, and normally no unfiltered flow directly passes to the secondary filter element.

11. A filter assembly in accordance with claim 10 wherein the orifice is in the form of a venturi passage in the poppet.

12. A full flow filter assembly comprising, in combination, a housing having inlet and outlet passages; a primary filter element disposed in the housing; a primary passage leading from the inlet only to the primary filter element; a secondary filter element disposed in the housing; a secondary passage communicating with the inlet and leading to the secondary filter element; and a flow responsive valve having a flow control passage therethrough disposed in the primary passage and arranged to direct all normal flow continuously to and through the primary passage to and through the primary filter element and disposed to close off flow through the secondary passage, but responsive to a predetermined excess volume of flow through the valve to open and allow such excess flow to enter the secondary passage and pass directly through the secondary filter element, while continuing normal flow to and through the primary filter element through the flow control passage, so that both normal and excess flow through the filter assembly is filtered, and normally no unfiltered flow passes directly to the secondary filter element.

13. A full flow filter assembly comprising, in combination, a housing having inlet and outlet passages, a primary filter element disposed in the housing, a primary passage leading from the inlet only to the primary filter element, a secondary filter element disposed in the housing, a secondary passage communicating with the inlet and leading to the secondary filter element, and a flow-responsive valve assembly comprising a valve and a flow control passage disposed in the housing in the primary passage and arranged to direct all normal flow continuously to and through the primary passage to and through the primary filter element and the valve being disposed to normally close off flow to the secondary filter element through the secondary passage, the flow control passage having a constriction dimensioned to increase the velocity of flow therethrough, said increased flow velocity thereby causing a corresponding decrease in pressure which is communicated to the valve, and said valve being responsive to a predetermined pressure decrease thereacross to open due to the decreased pressure whenever an increase in flow above a predetermined maximum occurs at the constriction, and to allow such excess flow to enter the secondary passage and pass directly through the secondary filter element, while continuing normal flow to and through the primary filter element through the flow control passage, so that both normal and excess flow through the filter assembly is filtered, and normally no unfiltered flow passes directly to the secondary filter element.

14. A flow control valve for mounting in a housing having a first and a second line, to control flow in both, and responsive to changes in volume of flow and changes in pressure, comprising a reciprocable poppet having a flow-controlling orifice therein, a valve seat, bias means normally biasing said poppet against said valve seat, the poppet permitting flow of fluid in the first line through the orifice at all positions of the poppet and being in a position to close off flow to the second line when against said valve seat; a closed pressure chamber within which the poppet reciprocates, said chamber communicating only with the orifice, the poppet having an inlet face exposed to pressure on the inlet side of the orifice, and having another face exposed to fluid pressure in the pressure chamber, the total surface area of the inlet face exposed to fluid pressure on the inlet side of the orifice being greater than the combined surface area of the face of the poppet in the pressure chamber and the surface area of the poppet exposed to pressure on the outlet side of the orifice, the orifice being dimensioned in relation to the first line to increase the velocity of flow therethrough from the inlet to the outlet faces of the poppet, and thereby reduce the static pressure at the orifice and in the pressure chamber, whereby (1) the poppet moves away from the valve seat whenever an increase in flow and corresponding increase in velocity through the orifice reduces pressure in the pressure chamber below a predetermined minimum, and thereby opens the second line, and (2) the poppet also is forced away from the valve seat to open the second line whenever inlet pressure exceeds a predetermined maximum.

15. A flow control valve in accordance with claim 13 wherein the orifice is in the form of a venturi passage through the poppet.

References Cited by the Examiner

UNITED STATES PATENTS

| | | | |
|---|---|---|---|
| 2,556,829 | 6/1951 | Teague | 137—117 |
| 2,922,431 | 1/1960 | Jensen | 137—117 |
| 3,000,505 | 9/1961 | Scavuzzo | 210—132 |
| 3,040,894 | 6/1962 | Pall | 210—90 |
| 3,120,490 | 2/1964 | Samson | 210—132 |
| 3,164,164 | 1/1965 | Pall et al. | 251—75 X |

REUBEN FRIEDMAN, *Primary Examiner.*

F. A. SPEAR, *Assistant Examiner.*